United States Patent Office 3,394,197
Patented July 23, 1968

3,394,197
PREPARATION OF DIVINYLIC MAGNESIUM COMPOUNDS
Paul Kobetz, Baton Rouge, La., assignor to Ethyl Corporation, New York, N.Y., a corporation of Virginia
No Drawing. Filed Oct. 12, 1964, Ser. No. 403,345
4 Claims. (Cl. 260—665)

ABSTRACT OF THE DISCLOSURE

Process for preparation of divinylic magnesium compounds by reacting a complex of vinylic magnesium chloride and cyclic mono ether with the dimethyl ether of diethylene glycol.

BACKGROUND OF THE INVENTION

According to U.S. Patent 2,999,889, issued Sept. 12, 1961, divinyl magnesium may be prepared by the reaction of divinyl mercury with magnesium according to the equation:

$$(CH_2=CH)_2Hg + Mg \rightarrow (CH_2=CH)_2Mg + Hg$$

However, the divinyl mercury used in this process must be made, for example, by adding mercuric chloride to vinyl sodium in a solvent. The vinyl sodium must in turn be prepared, for example, by the reaction of finely-dispersed sodium in a solvent with vinyl chloride. It would be desirable to have available a more straightforward method for the preparation of divinyl mercury.

As pointed out in U.S. 2,999,889 divinyl magnesium is useful as an intermediate in organic synthesis. Divinyl magnesium may also be added to fuels for jet engines to prevent "flame-out."

It is accordingly an object of this invention to provide a process for the preparation of divinylic magnesium compounds. It is a further object of this invention to provide an efficient and economical straightforward method for the preparation of divinyl magnesium compounds. These and other objects will become evident from the description which follows.

According to this invention it has been discovered that divinylic magnesium compounds may be produced by reacting a complex of a vinylic magnesium chloride compound and certain cyclic monoethers with the dimethyl ether of diethylene glycol. By such a process the divinylic magnesium compound is produced in a solution of the dimethyl ether of diethylene glycol and may be utilized as such or recovered therefrom.

U.S. Patent 2,838,508, issued June 10, 1958, discloses a method for the release of organomagnesium chloride type Grignard reagents from a complex of the organomagnesium chloride Grignard reagent with certain cyclic ethers. The object of the invention disclosed in U.S. 2,838,508 was to produce a wide variety of types of organomagnesium chloride Grignard reagents. According to U.S. 2,838,508, the complexes of the organomagnesium chloride Grignard reagent and the cyclic ether are reacted with the compounds of the formula RO(CH$_2$CH$_2$O)$_x$R′ wherein $x$ is a positive integer from 1 to 8, and R and R′ are hydrocarbon groups. R and R′ may be the same or different groups selected from aliphatic hydrocarbon groups, phenyl groups, substituted phenyl groups and aralkyl groups. By the process of U.S. 2,838,508, the complex of the organomagnesium chloride Grignard reagent and the cyclic ether is broken and the intact organomagnesium chloride Grignard reagent is produced.

According to the present invention, it has surprisingly been found that when a complex of certain cyclic ethers and a particular type of organomagnesium chloride compound is reacted with a specific ether an entirely different reaction takes place. According to this invention when a complex of certain cyclic ethers and a vinylic magnesium chloride compound is reacted with the dimethyl ether of diethylene glycol, the desired divinylic magnesium compound is formed in high yields. These results are in contrast to the results of U.S. 2,838,508 wherein the organomagnesium chloride Grignard reagent is simply released from the complex with a cyclic ether. For example, according to Example 2 of U.S. 2,838,508, methyl magnesium chloride was released from a complex methyl magnesium chloride and tetrahydrofuran by the addition to the complex of the diethyl ether of diethylene glycol. Similarly in Example 1 of the patent, vinyl magnesium chloride is released from a complex of vinyl magnesium chloride and tetrahydrofuran by the addition to the complex of the diethyl ether of diethylene glycol. On the other hand, it has now been found that if the dimethyl ether of diethylene glycol is used instead of the diethyl ether of diethylene glycol, divinyl magnesium is formed instead of vinyl magnesium chloride being released. In other words, the desired divinyl magnesium is formed in the dimethyl ether of diethylene glycol.

The complexes to be reacted with the dimethyl ether of diethylene glycol are complexes of a vinylic magnesium chloride and certain cyclic ethers. By the term vinylic magnesium chloride is meant 1-alkenyl compounds of the formula RR′C=CHMgCl wherein R and R′ are the same or different hydrocarbon radicals, hydrocarbonoxy radicals or hydrogen, such as those selected from the group consisting of hydrogen, alkyl, alkoxy, aryl, aralkyl, suitryl, aroxyl and mixtures thereof. The aryl radicals suitably contain a single benzene ring with the radicals being such as the phenoxy radical, phenyl radical and the mono, di and tri aliphatic substituted phenyl or phenoxy radicals. The vinylic magnesium chloride compounds will have from 2 to 20 carbon atoms. Examples of vinylic magnesium chloride compounds are vinyl magnesium chloride, propenyl magnesium chloride, hexenyl magnesium chloride, 2-ethyl hexenyl magnesium chloride, vinyl magnesium bromide, 2-phenyl ethenyl magnesium chloride, 2-phenoxy ethenyl magnesium chloride, 2-tolyl ethenyl magnesium chloride, cyclohexene-1-yl-1 magnesium chloride, mixtures thereof and the like. The preferred vinylic magnesium chloride is vinyl magnesium chloride. The vinylic magnesium chlorides of the formula R$_2$C=CHMgCl may be produced in conventional manner as illustrated by the examples.

The starting material complex to be reacted with the dimethyl ether of diethylene glycol will be a complex of the vinylic magnesium chloride compound and cyclic ethers capable of complexing with the vinylic magnesium chloride compound. Suitable cyclic ethers of the complex are mono ethers such as those having the formula

wherein R is an unsubstituted alkylene radical, R′ is selected from the group consisting of an ethylene radical, an ethylenically unsaturated divalent hydrocarbon radical, >CHA and mixtures thereof; Z is selected from the group consisting of a methylene radical, >NA and mixtures thereof, and A is an aliphatic radical of from 1 to 10 carbon atoms. When Z is >NR, the ring will contain 6 members and Z and O (i.e. the oxygen atom) will be 1,4 with respect to each other. The cyclic ethers will suitably contain up to 20 carbon atoms. Generally, there will be at least one hydrogen atom attached to each carbon atom in the ring. The cyclic ether may be substituted with radicals which will not react with the vinylic magnesium chloride compound. Suitable substituents are alkyl radicals such as ethyl, aryl radicals such as phenyl, alkoxy radicals such as methoxy, and aroxy radicals such as toloxy. The number of carbon atoms in the substituted radicals will be from one to 12, preferably from one to 8. Preferably the cyclic ethers will have from 5 to 6 atoms in the ring structure. The cyclic ethers will be constituted only of elements of the group consisting of carbon, hydrogen, oxygen and nitrogen. Suitable cyclic ethers are tetrahydrofuran, 3-ethyl tetrahydrofuran, 2-(o-toloxy) tetrahydrofuran, N-methyl morpholine, the methyl ether of tetrahydrofurfuryl alcohol, 3-phenoxy-tetrahydrofuran, 4-ethoxy-tetrahydrofuran, 2,5-dihydrofuran, tetrahydropyran, 4-methoxy-tetrahydropyran, 2-ethoxy-3,4-dihydro-2H-pyran, mixtures thereof and the like.

The preferred cyclic ethers complexed with the vinylic magnesium chloride are tetrahydrofuran and tetrahydropyran being especially preferred as high yields of divinylic magnesium compounds are produced. The oxygen of the cyclic ether must be free to form a complex with the vinylic magnesium chloride, consequently, the cyclic ethers employed should not have groups in the ring which would block the formation of a complex between the ring oxygen and the vinylic magnesium chloride.

The process of this invention may be more completely understood and illustrated by the following examples. All parts are by weight unless expressed otherwise.

Example I

The divinyl magnesium was prepared by reacting a tetrahydrofuran (THF) complex of vinyl magnesium chloride with the dimethyl ether of diethylene glycol (DMC). The complex of vinyl magnesium chloride and tetrahydrofuran was prepared by the reaction of magnesium and vinyl chloride in tetrahydrofuran. Magnesium chips, 121.6 g., were reacted in 1,075 g. of tetrahydrofuran (THF) with 396 g. of vinyl chloride. The reaction product was cooled and unreacted vinyl chloride was vented. The product solution, 1300 ml., was decanted and 500 ml. of tetrahydrofuran was added to extract the residue. Most of the residue went into solution, which was then decanted and added to the product solution making a total of 1900 ml. Aliquots of this product solution indicated it was 2.64 molar with respect to magnesium and 2.74 molar with respect to chloride ions. The product was vinyl magnesium chloride dissolved in tetrahydrofuran.

A 125 ml. portion of the vinyl magnesium chloride product solution (equivalent to about 335 millimols of vinyl magnesium chloride) and 200 ml. of dimethyl ether of diethylene glycol were added to a 500 ml. round bottom flask with a magnetic stirrer. The flask contents were heated to 50° C. and stirred slowly for 20 minutes to cause the magnesium chloride crystals to grow to facilitate their removal by filtration. The solids were removed by a vacuum filtration in a dry box using a fine fritted glass filter and washed with two 15 ml. portions of DMC. The THF and some DMC were removed from the filtrate by warming the flask with a heating mantle while pulling a strong vacuum on the flask. Aliquots of the filtrate were analyzed for magnesium and chloride. An aliquot was hydrolyzed, evolved gases were collected and analyzed by mass spectrographic methods. A sample of the vinyl magnesium chloride in THF was also hydrolyzed and evolved gases analyzed for a comparison. The solids on the fritted glass filter were dissolved in a small quantity of dilute sulfuric acid and analyzed for magnesium and chloride ions. The magnesium and chloride analysis revealed that 85 to 90 mol percent of the vinyl magnesium chloride was converted to divinyl magnesium.

Example II

Example I is repeated with the exception that tetrahydropyran is substituted for the tetrahydrofuran of Example I. A high yield of divinyl magnesium is obtained.

Example III

Example I is repeated with the exception that a complex of 1-propenyl magnesium chloride and tetrahydrofuran is utilized instead of the vinyl magnesium chloride complex of Example I. Also in this example tetrahydrofuran is present in an amount of 2.5 moles per mole of the 1-propenyl magnesium chloride in the complex. The product, di-1-propenyl magnesium, is obtained in good yields.

Example IV

Example III is repeated with the exception that tetrahydropyran is substituted for the tetrahydrofuran of Example III.

Example V

Example I is repeated with the exception that 4-methoxy tetrahydrofuran is substituted for the tetrahydrofuran of Example I. Excellent results are obtained by the use of this cyclic ether.

Example VI

Example III is repeated with the exception that the starting material complex is a complex of 3.0 moles of tetrahydrofuran and 1.0 mol of 2-methyl-1-butenyl magnesium chloride. The product obtained is di-2-methyl-1-butenyl magnesium.

In the initial complex of the cyclic ether with the vinylic magnesium chloride, the cyclic ether should preferably be present in an amount of at least about one mole of cyclic ether per mole of vinylic magnesium chloride and better results are generally obtained when the cyclic ether is present in an amount of greater than one mole per mol of vinylic magnesium chloride. The upper limit of cyclic ether is not particularly critical but for economic reasons will not ordinarily exceed 4 or 5 moles of cyclic ether per mole of vinylic magnesium chloride. A suitable range is from about .75 to 3.5 moles of cyclic ether per mole of vinylic magnesium chloride. Solvents or diluents may be added to the reaction of the complex with the dimethyl ether of diethylene glycol. However, selection of the quantity and type of the solvent should be controlled in order that the production of the desired divinylic magnesium compounds be achieved. The cyclic ether will, for best results, constitute at least 75 mol percent of the total solvent and diluent present in the composition of the complex to be reacted with the dimethyl ether of diethylene glycol to form the divinylic magnesium compound.

The amount of dimethyl ether of diethylene glycol reacted with the complex may be varied somewhat. However, best results are obtained when the dimethyl ether of diethylene glycol is employed in an amount from about one to 100 moles of dimethyl ether of diethylene glycol per mole of the complex, and preferably from one to 10 moles per mole of the complex.

The reactor employed may be of conventional design. The reactor should, of course, be suitable for operating under the pressure generated by the particular reactants at the temperature of reaction.

The temperatures of reaction is not critical. It should be sufficiently high to give reasonable reaction rates but should not be above decomposition temperature of the organometallic reactants or the divinylic magnesium products. Thus, the operating temperature of the reaction depends upon the particular organometallic compounds and cyclic ethers involved. In general, suitable temperatures are between about 0° C. and about 80° C., but temperatures from about 25° C. to 70° C. are preferred to facilitate heat removal and for best results.

The pressure during the reaction is not critical. About atmospheric pressure is normally employed, although subatmospheric pressures are permissible. In some instances, supraatmospheric pressure is preferred, particularly when employing a relatively high temperature and a relatively volatile solvent. Also, a pressure of inert gas such as nitrogen is sometimes desirable, for example, to assure anhydrous conditions. The pressure will generally be from about 10 inches vacuum to 200 p.s.i.g. with the range of about atmospheric (STP) to 100 p.s.i.g. being a practical range.

Other embodiments of this invention can be made without departing from the spirit and scope of this invention which is not limited to the specific embodiments given herein.

What is claimed is:

1. A process for the preparation of a divinylic magnesium product which comprises, in combination, the steps of:
    (a) preparing a complex of at least about one mole of cyclic mono ether per mole of vinylic magnesium chloride;
    (b) mixing the prepared complex with from about one to about 100 moles of liquid dimethyl ether of diethylene glycol per mole of prepared complex to form a precipitate, and
    (c) recovering the remaining liquid from said precipitate as the divinylic magnesium product;
said cyclic mono ether being at least one ether represented by the formula

wherein R is an alkaline radical, R' is selected from a group consisting of an ethylene radical, an ethylenically unsaturated divalent hydrocarbon radical, >CHA; Z is selected from the group consisting of a methylene radical and >NA, and A is an aliphatic radical, and said vinylic magnesium chloride being at least one compound represented by the formula, $R_1R_2C\!=\!CHMgCl$, wherein $R_1$ and $R_2$ each are at least one monovalent radical selected from the group consisting of alkyl, alkoxy, aryl, aralkyl, alkaryl, aroxy and hydrogen and said vinylic magnesium chloride compound has from 2 to 20 carbon atoms.

2. The process of claim 1 further characterized by said vinylic magnesium chloride being vinyl magnesium chloride.

3. The process of claim 1 further characterized by said cyclic mono ether being tetrahydrofuran.

4. The process of claim 1 further characterized by said cyclic mono ether being tetrahydropyran.

References Cited

UNITED STATES PATENTS 3,007,858  11/1961  Braithwaite _____ 204—59

OTHER REFERENCES

Cope: J. Am. Chem. Soc. 60 (1938), pp. 2215–7.
Normant: Bull, Soc. Chim. France (1957), pp. 728–733.

TOBIAS E. LEVOW, *Primary Examiner*

A. P. DEMERS, *Assistant Examiner.*